UNITED STATES PATENT OFFICE

NIELS C. CHRISTENSEN, OF SALT LAKE CITY, UTAH

PROCESS FOR THE PRECIPITATION OF ZINC SULPHIDE AND THE MANUFACTURE OF ZINC SULPHIDE PIGMENTS

No Drawing.  Application filed November 5, 1930.  Serial No. 493,685.

This invention relates to processes for the precipitation of zinc from chloride solution as zinc sulphide and for the making of zinc sulphide pigments. It is especially applicable in connection with the acid chloride brine leaching processes described in U. S. Patents Nos. 1,539,711; 1,539,712; 1,539,714; 1,435,891 and U. S. patent application No. 66,400 for the recovery of the zinc from the chloride solutions used in said processes, as zinc suplhide and for the manufacture of zinc sulphide pigments from the precipitated zinc sulphide. It is also applicable for the recovery of zinc as a sulphide from other chloride solutions and for the preparation of zinc sulphide pigments therefrom. It is also particularly applicable to the making of a variety of ZnS pigments having varying percentages of different bases (coating dilutents) or mixtures of bases in different proportions.

As disclosed in my U. S. patent applications Nos. 66,400; 106,567; 198,607; and 198,608, zinc sulphide may be precipitated from chloride solutions by the simultaneous treatment of said solutions with $H_2S$ and finely divided calcium carbonate. A pure white high grade precipitate of zinc sulphide which is easily filtered and washed may be secured by this method. The precipitation by this method, though entirely practical and efficient and satisfactory in operation, has the following disadvantages: The precipitation process is relatively slow, particularly in concentrated chloride brines, requiring from one half to two hours. An excess of $H_2S$ must also be used, which remains in the solution after the precipitation of the zinc sulphide and which must be removed from the solution to avoid loss of this reagent and to prepare the solutions for further leaching operations. In this precipitation process carbon dioxide is also evolved, which, unless using the method of U. S. patent application 106,567, contaminates the $H_2S$ applied to the solution and carries $H_2S$ away with it which must be recovered. This will be apparent from the following chemical equation showing the reactions taking place in the process:

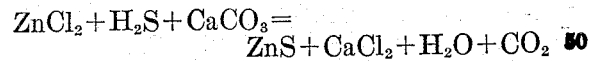
$$ZnCl_2 + H_2S + CaCO_3 = ZnS + CaCl_2 + H_2O + CO_2$$

The evolved $CO_2$ carries $H_2S$ away with it from the precipitation apparatus. It is the object of my invention to avoid these difficulties, i. e., to secure a more rapid precipitation, to avoid the use of an excess of $H_2S$, and to avoid the necessity of recovering excess $H_2S$ from the precipitated solution and from gases contaminated with $CO_2$.

As also disclosed in my U. S. Patents 1,549,063 and 1,572,268, zinc may also be precipitated from chloride solutions by means of calcium sulphydrate as indicated by the following chemical equation:

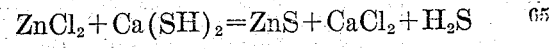
$$ZnCl_2 + Ca(SH)_2 = ZnS + CaCl_2 + H_2S$$

The $H_2S$ evolved in the above reaction may precipitate more zinc from the solution if more than the equivalent of zinc to calcium as shown in the reaction is present in the solution is indicated in the following chemical equation:

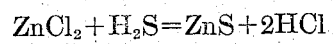
$$ZnCl_2 + H_2S = ZnS + 2HCl$$

In this case the precipitated solution would contain HCl and residual $H_2S$, which later should be recovered and should also be removed from the solution to prepare it for reuse. An acid solution at this point in the processes is also not desirable since it necessitates the use of acid-proof filters and other acid-proof apparatus. If a considerable excess of $Ca(SH)_2$ is used, the precipitated ZnS is difficult to filter and wash and the excess $Ca(SH)_2$ left in the solution is not only wasted during the leaching part of the next cycle of the process but also consumes acid. The close regulation required with this reagent is therefore somewhat difficult to obtain. It is the object of my invention to avoid this necessity for such close regulation, to avoid the necessity of recovering excess $H_2S$ from the solution and to avoid an acid solution after precipitation. It is also the object of my invention to make possible not only the preparation of a pure zinc sulphide pigment from zinc-chloride solutions, but also a zinc sulphide pigment with a physically combined or coated base or dilutent such as calcium carbonate, barium sulphate, barium carbonate, silica, or other suitable material.

In the processes described and claimed herein, both calcium sulphydrate and calcium carbonate are used in the precipitation of the zinc sulphide, but are used in combination with each other and in such a manner as to avoid the disadvantages and difficulties of the older processes described above.

This process of precipitation consists in general terms in adding calcium sulphydrate in solution and finely divided calcium carbonate to the zinc chloride solution so as to precipitate the zinc as a sulphide as indicated in the following equation:

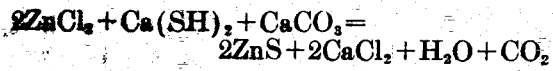

The sulphydrate solution as prepared in practical operation may contain some $H_2S$ in solution. Sufficient calcium carbonate should be added to utilize this reagent in the precipitation of zinc from the chloride solution as indicated in the following chemical equation:

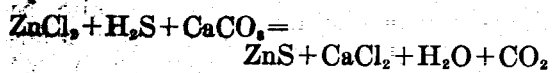

It is preferable, however, to avoid the presence of any considerable quantity of free $H_2S$ in the sulphydrate solution, and this may be removed by keeping some solid CaS in suspension in the solution after its removal from contact with the $H_2S$ gas in the sulphydrate plant so that the free $H_2S$ may be absorbed according to the following reaction:

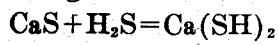

The precipitation of the zinc as ZnS by this method either in cold or hot solution is rapid and complete, and either in ordinary aqueous solutions or in chloride brines such as those used in the brine leaching process mentioned above.

The zinc sulphide precipitated as described above contains a considerable amount of water, the formula representing the precipitate being written ZnS x $H_2O$. This product is filtered out of the solution and thoroughly washed to remove all soluble material in the solution from which it is precipitated. When dried at a low temperature this product has a relatively low tinting strength and hiding power, and is of little value as a paint pigment. These properties are greatly improved by heating to a moderately high temperature, 500° C. or somewhat higher, and plunging into water. This "quenched" product is then finely ground either wet or dry, though preferably wet, and when ground has excellent qualities as a paint pigment approaching titanium oxide in the qualities of tinting strength, hiding power and brightness.

An excellent paint pigment may be made in this process by adding an excess of finely pulverized calcium carbonate during the precipitation of the zinc sulphide as previously described so as to form what might be called a calcium carbonate base lithopone. The addition of an excess of calcium carbonate gives a product which settles and filters somewhat more readily than the pure zinc sulphide product. The zinc sulphide thus precipitated contains water, as described above, which must be removed by drying and heating as described above to remove this water and "fix" the sulphide as a coating on the calcium carbonate particles. The calcining or heating operation must be carried out at a temperature below the beginning of decomposition of the calcium carbonate but should be carried out as near this point as is safe in the type of furnace used. Unless this operation is carried out in an atmosphere of $CO_2$ temperatures much higher than 500° should not be used as some decomposition of the $CaCO_3$ may occur forming CaO which even in very small quantity has a deleterious effect in a paint. After heating or calcination and quenching the product is finely ground and dried to form the finished product.

The calcium carbonate base pigment thus formed may contain any desired proportion of calcium carbonate the best products appearing to result from the use of from 25% to 60% $CaCO_3$. The tinting strength covering power and brightness of these calcium carbonate base pigments decrease as compared with pure zinc sulphide with increase in percentage of calcium carbonate but mixtures containing as high as 50% $CaCO_3$ show these properties but little reduced as compared with the pure zinc sulphide.

The pigments having suitable bases other than $CaCO_3$ such as $BaSO_4$, $BaCO_3$, $SiO_2$, etc., are prepared by adding these in place of the excess $CaCO_3$ during precipitation, and thereafter filtering, washing, drying, calcining, quenching, grinding and drying in the manner described above for ZnS and the ZnS-$CaCO_3$ pigment, and also as further described below.

The heating or calcination of both the ZnS and the ZnS-$CaCO_3$ and other base mixtures should preferably be carried out in an atmosphere of inert or inactive gas, preferably $CO_2$, or nitrogen or helium, rather than in air so as to prevent oxidation of the ZnS to ZnO.

The method of carrying out the process as a whole is briefly as follows: The $H_2S$ for precipitation of the zinc is derived from the dissolving of the PbS (and to a limited extent ZnS) in the processes described in my U. S. Patents Nos. 1,539,711; 1,539,712; 1,539,714; 1,435,891 or from the dissolving of ZnS (and also PbS) in the process described in my U. S. patent application 66,400, as indicated in the following chemical equations:

$$PbS + 2HCl = PbCl_2 + H_2S$$
$$ZnS + 2HCl = ZnCl_2 + H_2S$$

or may be derived from the treatment of ZnS with $H_2SO_4$, as described in my U. S. Patents 1,434,084 and 1,435,699, and as indicated in the following:

$$ZnS + H_2SO_4 = ZnSO_4 + H_2S$$

or may be derived from other suitable sources. The $H_2S$ gas is absorbed in a lime emulsion in brine or water according to the solution to be precipitated. For precipitation from the chloride brines, use the processes described in U. S. Patents 1,539,711; 1,539,712, etc., the $Ca(SH)_2$ would preferably be made up in the diluted barren sodium chloride brine to avoid further dilution of the leaching solution. For precipitation from the $CaCl_2$ brine used in the process described in U. S. patent application 66,400, the $Ca(SH)_2$ solution should preferably be made up in the diluted barren $CaCl_2$ brine. For use with ordinary aqueous solutions of $ZnCl_2$ the $Ca(SH)_2$ solution will be made with water. The preferred method of making the $Ca(SH)_2$ solution consists in making an emulsion of $Ca(OH)_2$ in the brine or water to be used and passing this emulsion in counter-current to the flow of $H_2S$ gas through a series of spray chambers such as described in my U. S. Patent 1,452,363 in which the pulp is sprayed into the gas in the chamber by means of a cylinder rotating rapidly about its axis in horizontal position and dipping slightly into the pulp. By this method a practically complete absorption of the $H_2S$ may be secured and solutions containing as high as 25% $Ca(SH)_2$ either in the brine or water may be secured. The $Ca(SH)_2$ solution thus secured should preferably be agitated for a short time in contact with some unconverted CaS in order to absorb the free $H_2S$ in the solution. The $Ca(SH)_2$ solution from the absorption plant should then be filtered (or settled) to remove the solid impurities and secure a pure solution. The residual solids consist mainly of silica, iron sulphide and undecomposed calcium carbonate, the iron sulphide formed from traces of iron in the lime coloring this residue an intense black.

The solution carrying the zinc, first freed from all metallic impurities such as iron, manganese, copper, lead, and cadmium is then precipitated by means of the $Ca(SH)_2$ solution and finely divided or precipitated calcium carbonate which must also be freed from such metallic impurities as those just mentioned, as previously described. In order to avoid loss of $H_2S$ the calcium carbonate should be thoroughly mixed with the zinc solution before the addition of the $Ca(SH)_2$ or may be added at the same time as the $Ca(SH)_2$ is added and preferably in emulsion with the $Ca(SH)_2$ solution. If the $CaCO_3$ is added after the $Ca(SH)_2$ or in insufficient quantity a loss of $H_2S$ will occur and the zinc precipitation will be incomplete since the reaction goes on in three stages as indicated below:

$$ZnCl_2 + Ca(SH)_2 = ZnS + CaCl_2 + H_2S$$
$$ZnCl_2 + H_2S = ZnS + 2HCl$$
$$2HCl + CaCO_3 = CaCl_2 + H_2O + CO_2$$

Since the second reaction only continues until the acid concentration prevents further precipitation of the zinc sulphide, the $CaCO_3$ must be present to neutralize the acid and allow complete precipitation of the zinc as indicated in the combined equation below which shows the final result of the reactions in the solution:

$$2ZnCl_2 + Ca(SH)_2 + CaCO_3 = 2ZnS + 2CaCl_2 + H_2O + CO_2$$

Though the precipitation may be carried out in cold solutions, in order to secure a product which settles readily and is easily filtered and washed, the solution should be hot, preferably at or nearly the boiling point. If the $CaCO_3$ is thoroughly mixed with the solution before or at the same time as the $Ca(SH)_2$ is added practically no $H_2S$ will be lost from the solution even though a violent evolution of $CO_2$ occurs during the precipitation of the ZnS. When the $CaCO_3$ is added to the boiling brine or water containing the $ZnCl_2$ in solution before the addition of the $Ca(SH)_2$, a considerable evolution of $CO_2$ occurs due to a reaction between the $ZnCl_2$ and the $CaCO_3$ by which basic zinc carbonate (or zinc hydroxide) and $CaCl_2$ is formed and $CO_2$ driven off. This reaction is incomplete and only part of the $CaCO_3$ is consumed in this reaction. The zinc hydroxide formed is converted to ZnS during the precipitation so that the final result is the same as if there had been no reaction between the $ZnCl_2$ and $CaCO_3$. The reactions are indicated in the following equations:

$$ZnCl_2 + CaCO_3 + H_2O = Zn(OH)_2 + CaCl_2 + CO_2$$
$$ZnCl_2 + Zn(OH)_2 + Ca(SH)_2 = 2ZnS + CaCl_2 + 2H_2O$$

If the calcium carbonate base zinc sulphide pigment is to be made, the excess $CaCO_3$ is preferably added with that necessary for the precipitation. This excess may vary from none to sufficient to make a pigment containing as much as 75% $CaCO_3$. The precipitate containing the excess $CaCO_3$ settles and filters more readily than the pure zinc sulphide, the effect being more marked with increase in the proportion of excess $CaCO_3$. Products other than $CaCO_3$ such as $BaCO_3$, $BaSO_4$, $SiO_2$, $Al_2O_3$, etc., may be substituted for the excess $CaCO_3$ to secure a variety of zinc sulphide paint pigments having a number of different bases or inert diluting material. These materials in finely divided condition, where possible preferably finely divided precipitated products, may be added with the $CaCO_3$ and $Ca(SH)_2$ used for precipitation of the ZnS, or may be mixed with the zinc sulphide suspension in solution immediately after the precipitation of the ZnS. When insoluble products such as $BaSO_4$, $SiO_2$, etc., are used, they should preferably be mixed with the solution before the addition of the $CaCO_3$ and $Ca(SH)_2$ for precipitation of the ZnS. Material such as $BaCO_3$, which may act in a manner similar to the $CaCO_3$ during the precipitation as shown in the following equation,

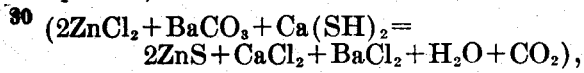

should preferably be added immediately after the precipitation of the sulphide. It is obvious that by the foregoing method a zinc pigment having any desired base may be prepared by the heating and quenching of the product and grinding and drying as described above.

It is also obvious that zinc sulphide pigments may also be made by adding inert bases such as $BaSO_4$, $SiO_2$, $Al_2O$, etc., to the solutions which are precipitated with $H_2S$ and finely divided $CaCO_3$. as described in my U. S. patent applications 66,400; 106,567; 198,607 and 198,608, in which the zinc is precipitated as ZnS as indicated below:

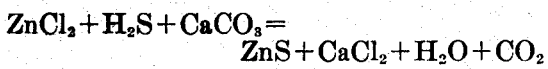

In this case the dilutent or base to be coated with the ZnS should preferably be added to the solution before the precipitation of the ZnS so that the ZnS is precipitated in the presence of the finley divided base. The added base makes a product which is readily filtered and washed. Drying, heating, quenching and grinding of the product is necessary to dehydrate the ZnS and "fix" the ZnS upon the base, giving a pigment having the desirable qualities as mentioned above.

The zinc sulphide pigments having the different bases or coated dilutents mentioned above may also be prepared by adding the inert bases to the $ZnCl_2$ solution to be precipitated with $Ca(SH)_2$ as described in my U. S. Patents 1,549,063 and 1,572,268 in which the zinc is precipitated according to the following reaction:

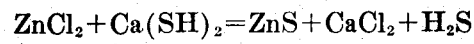

The bases or dilutents are preferably added to the solution before the precipitation of the ZnS so that the latter is precipitated in the presence of the finely divided base. The mixed product thus formed also filters and washes with less difficulty than the pure ZnS precipitate. Washing, drying, heating, grinding and drying this product as described above bring out its desirable qualities as a paint pigment as noted above.

Having described my process what I claim and desire to patent is:

1. The process of precipitating zinc from a chloride solution which consists in adding calcium sulphydrate to said solution in the presence of finely divided calcium carbonate in said solution and thereby precipitating the zinc as zinc sulphide.

2. The process of precipitating zinc from a chloride solution which consists in adding calcium sulphydrate to said solution in the presence of finely divided calcium carbonate in said solution and thereby precipitating the zinc as zinc sulphide and forming calcium chloride in said solution from said calcium compounds.

3. The process of precipitating zinc from solution in chloride brines which consists in adding calcium sulphydrate to said solution in the presence of finely divided calcium carbonate in said solution and thereby precipitating the zinc as a sulphide.

4. The process of precipitating zinc from a chloride solution which consists in mixing finely divided calcium carbonate with said solution and adding calcium sulphydrate to said mixture in substantially equi-molecular proportions to the added calcium carbonate and thereby precipitating the zinc as a sulphide and forming calcium chloride in said solution from said calcium compounds.

5. The process of precipitating zinc from solution in a chloride brine which consists in mixing finely divided calcium carbonate with said solution and adding calcium sulphydrate to said mixture in substantially equi-molecular proportions to the calcium carbonate and thereby precipitating the zinc as a sulphide.

6. The process of precipitating zinc from a chloride solution which consists in adding to said solution a suspension of finely divided calcium carbonate in a calcium sulphydrate solution in substantially equi-molecular proportions and thereby precipitating the zinc as a sulphide.

7. The process of precipitating zinc from solution in a chloride brine which consists in adding to said solution a suspension of finely divided calcium carbonate in a calcium sulphydrate solution in substantially equi-molecular proportions and thereby precipitating the zinc as a sulphide.

8. The process of making zinc sulphide pigments from zinc in chloride solutions which consists in precipitating the zinc from said solutions as zinc sulphide by means of finely divided calcium carbonate and calcium sulphydrate solution as described, and filtering and drying said precipitated zinc sulphide and heating said product at a temperature above five hundred degrees centigrade and immersing said hot product in water and grinding said quenched product to form a zinc sulphide pigment.

9. The process of making zinc sulphide pigments from zinc in chloride solutions which consists in precipitating the zinc from said solutions by means of finely divided calcium carbonate and calcium sulphydrate solution as described and mixing a finely divided insoluble base with said precipitated zinc sulphide in suspension in solution and filtering out and washing and drying said mixture and heating said mixture at a temperature above five hundred degrees centigrade and immersing said heated product in water and grinding said quenched product to form a zinc sulphide pigment.

10. The process of making zinc sulphide pigments from zinc in chloride solutions which consists in precipitating the zinc from said solutions by means of finely divided calcium carbonate and calcium sulphydrate solution as described and mixing a finely divided silica with said precipitated zinc sulphide in suspension in solution and filtering out and washing and drying said mixture and heating said mixture at a temperature above five hundred degrees centigrade and immersing said heated product in water and grinding said quenched product to form a zinc sulphide pigment.

11. The process of making zinc sulphide pigments from zinc in chloride solutions which consists in precipitating the zinc from said solutions by means of finely divided calcium carbonate and calcium sulphydrate solution as described in the presence of a finely divided insoluble base not formed in said precipitation and filtering out and washing and drying the mixture of said base and said precipitated zinc sulphide and heating said mixture at a temperature above five hundred degrees centigrade and immersing said heated product in water and grinding said quenched product to form a zinc sulphide pigment.

12. The process of making zinc sulphide pigments from zinc in chloride solutions which consists in precipitating the zinc from said solutions by means of finely divided calcium carbonate and calcium sulphydrate solution as described in the presence of a finely divided silica and filtering out and washing and drying the mixture of said base and said precipitated zinc sulphide and heating said mixture at a temperature above five hundred degrees centigrade and immersing said heated product in water and grinding said quenched product to form a zinc sulphide pigment.

In testimony whereof I have signed my name to this specification.

NIELS C. CHRISTENSEN.